United States Patent
Faroudja

(10) Patent No.: US 7,310,370 B2
(45) Date of Patent: Dec. 18, 2007

(54) MULTI-LAYER VIDEO COMPRESSION SYSTEM WITH SYNTHETIC HIGH FREQUENCIES

(75) Inventor: Yves C. Faroudja, Los Altos Hills, CA (US)

(73) Assignee: The Yves Faroudja Project, Inc., Los Altos, CA (US)

(*) Notice: Subject to any disclaimer, the term of this patent is extended or adjusted under 35 U.S.C. 154(b) by 609 days.

(21) Appl. No.: 10/487,764

(22) PCT Filed: Aug. 27, 2002

(86) PCT No.: PCT/US02/27443

§ 371 (c)(1),
(2), (4) Date: Feb. 24, 2004

(87) PCT Pub. No.: WO03/021969

PCT Pub. Date: Mar. 13, 2003

(65) Prior Publication Data

US 2004/0196902 A1     Oct. 7, 2004

Related U.S. Application Data

(60) Provisional application No. 60/316,364, filed on Aug. 30, 2001.

(51) Int. Cl.
*H04B 1/66* (2006.01)
*H04N 7/12* (2006.01)
*H04N 11/02* (2006.01)

(52) U.S. Cl. ............................ 375/240.1; 375/240.11

(58) Field of Classification Search ............ 375/240.1, 375/240.11
See application file for complete search history.

(56) References Cited

U.S. PATENT DOCUMENTS

| | | | |
|---|---|---|---|
| 2,740,071 A | 3/1956 | Goldmark et al. | |
| 2,851,522 A | 9/1958 | Hollywood | |
| 4,030,121 A | 6/1977 | Faroudja | |
| 4,504,853 A | 3/1985 | Faroudja | |
| 4,943,849 A * | 7/1990 | Faroudja et al. | 348/470 |
| 5,014,119 A | 5/1991 | Faroudja | |
| 5,151,783 A | 9/1992 | Faroudja | |

(Continued)

OTHER PUBLICATIONS

Goldmark, et al., "A New Technique for Improving the Sharpness of Television Pictures," Proc. Of the I.R.E., Oct. 1951, pp. 1314-1322.

*Primary Examiner*—Tung Vo
*Assistant Examiner*—Chikaodili E Anyikire
(74) *Attorney, Agent, or Firm*—Gallagher & Lathrop; Thomas A. Gallagher

(57) ABSTRACT

Multi-layered motion or still video compression includes, in an encoder or encoding function aspect of the invention, separating the video signal into low-frequency and high-frequency components, processing the low-frequency components of the video signal to generate synthetic high-frequency components, the low-frequency components or a data reduced version of the low-frequency components comprising a main or base layer, and generating the difference between the synthetic high-frequency components and the actual high-frequency components, the difference comprising an error or enhancement layer signal. A decoder or decoding function aspect of the invention processes the main layer to generate synthetic high-frequency components and combines the synthetic high-frequency components, main layer and enhancement layer to provide a decoded output signal similar to the video signal applied to the encoder.

11 Claims, 11 Drawing Sheets

U.S. PATENT DOCUMENTS

| | | | |
|---|---|---|---|
| 5,237,414 A * | 8/1993 | Faroudja | 348/606 |
| 5,349,383 A | 9/1994 | Parke et al. | |
| 5,408,270 A | 4/1995 | Lim | |
| 5,418,571 A | 5/1995 | Ghanbari | |
| 5,717,789 A | 2/1998 | Anderson et al. | |
| 5,742,343 A | 4/1998 | Haskell et al. | |
| 5,805,741 A | 9/1998 | Shinohara | |
| 5,844,617 A | 12/1998 | Faroudja et al. | |
| 5,852,565 A | 12/1998 | Demos | |
| 5,940,141 A | 8/1999 | Faroudja et al. | |
| 5,988,863 A | 11/1999 | Demos | |
| 6,043,846 A | 3/2000 | Shen et al. | |
| 6,052,416 A | 4/2000 | Koga | |
| 6,108,453 A | 8/2000 | Acharya | |
| 6,173,013 B1 | 1/2001 | Suzuki et al. | |
| 6,195,390 B1 | 2/2001 | Hashino et al. | |
| 6,229,850 B1 | 5/2001 | Linzer et al. | |
| 6,873,655 B2 * | 3/2005 | Comer et al. | 375/240.11 |

* cited by examiner

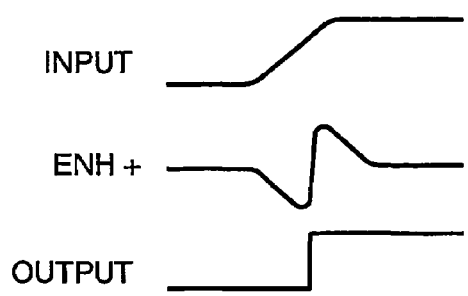
FIG._1A
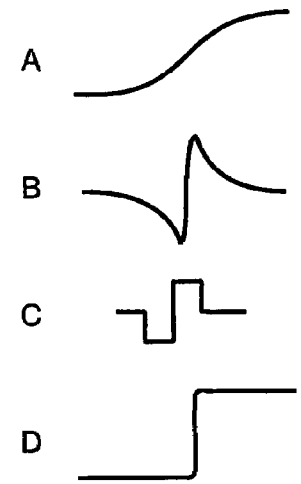
FIG._1E
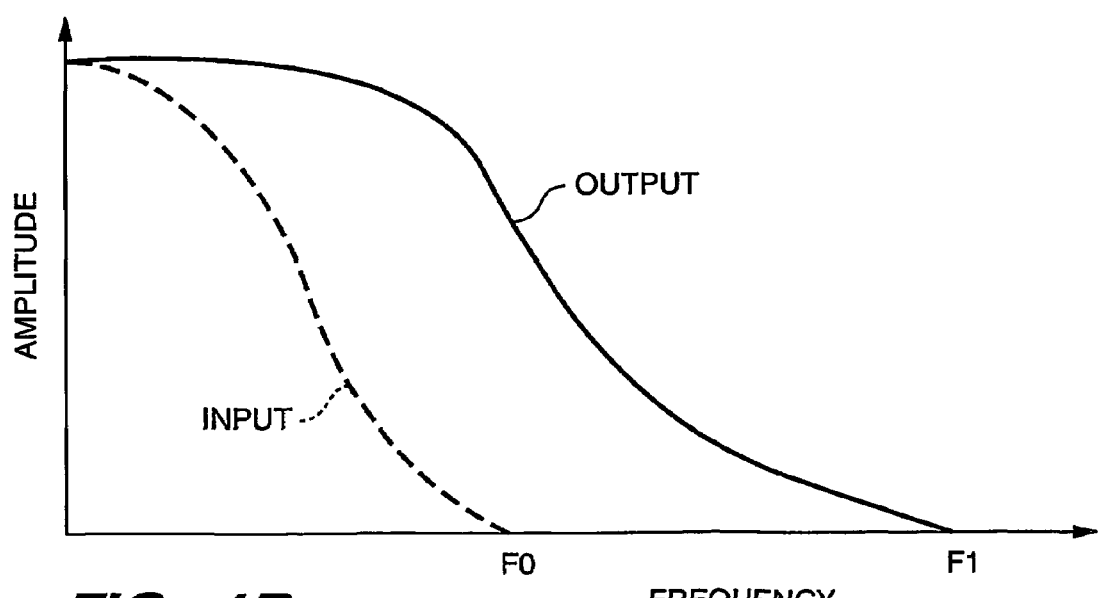
FIG._1B

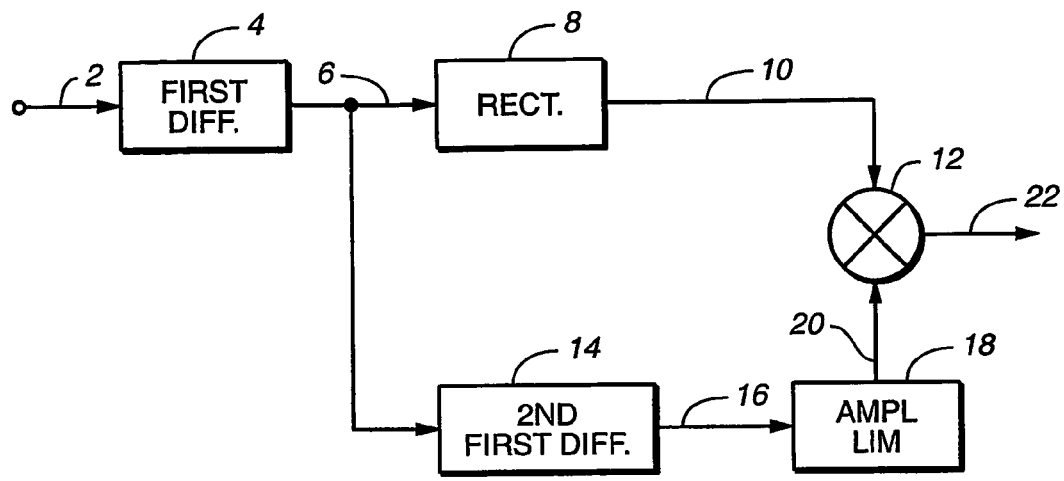
FIG._1C
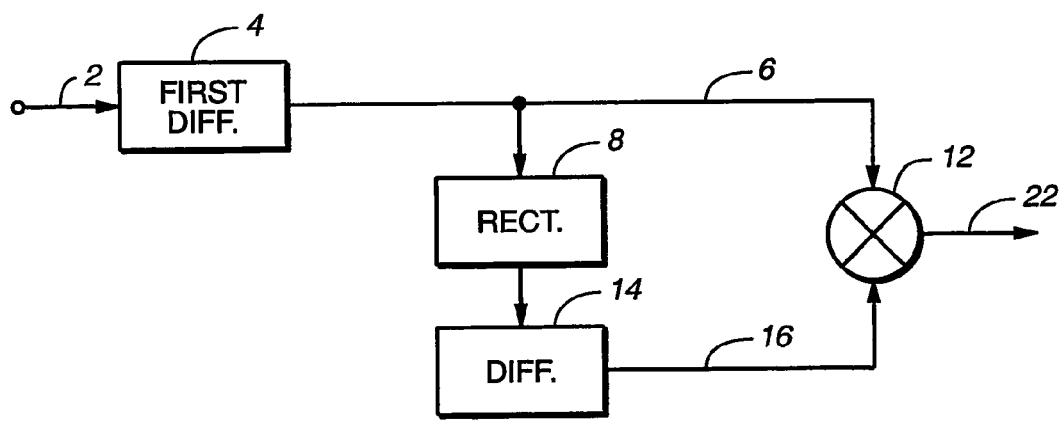
FIG._1D

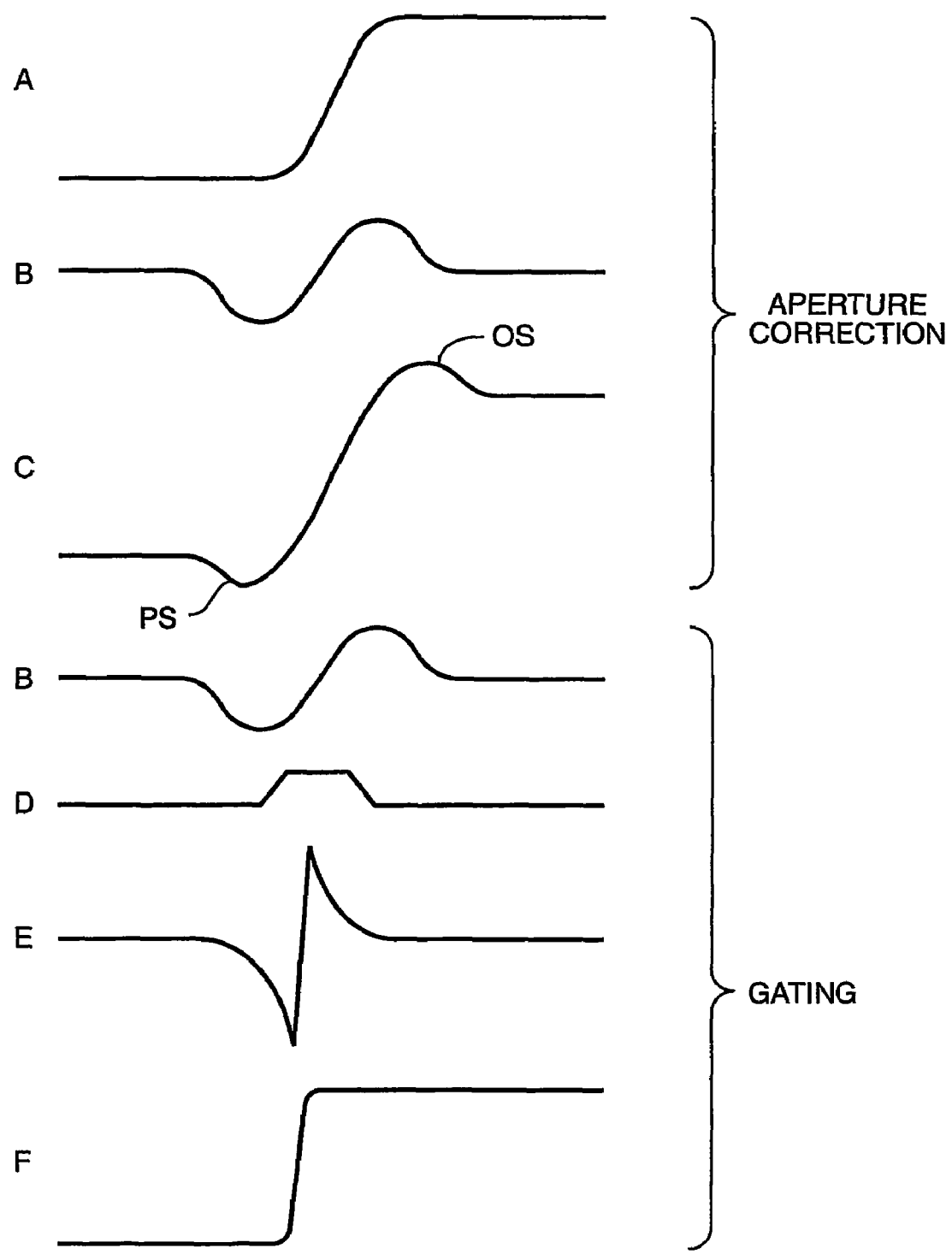
FIG._2

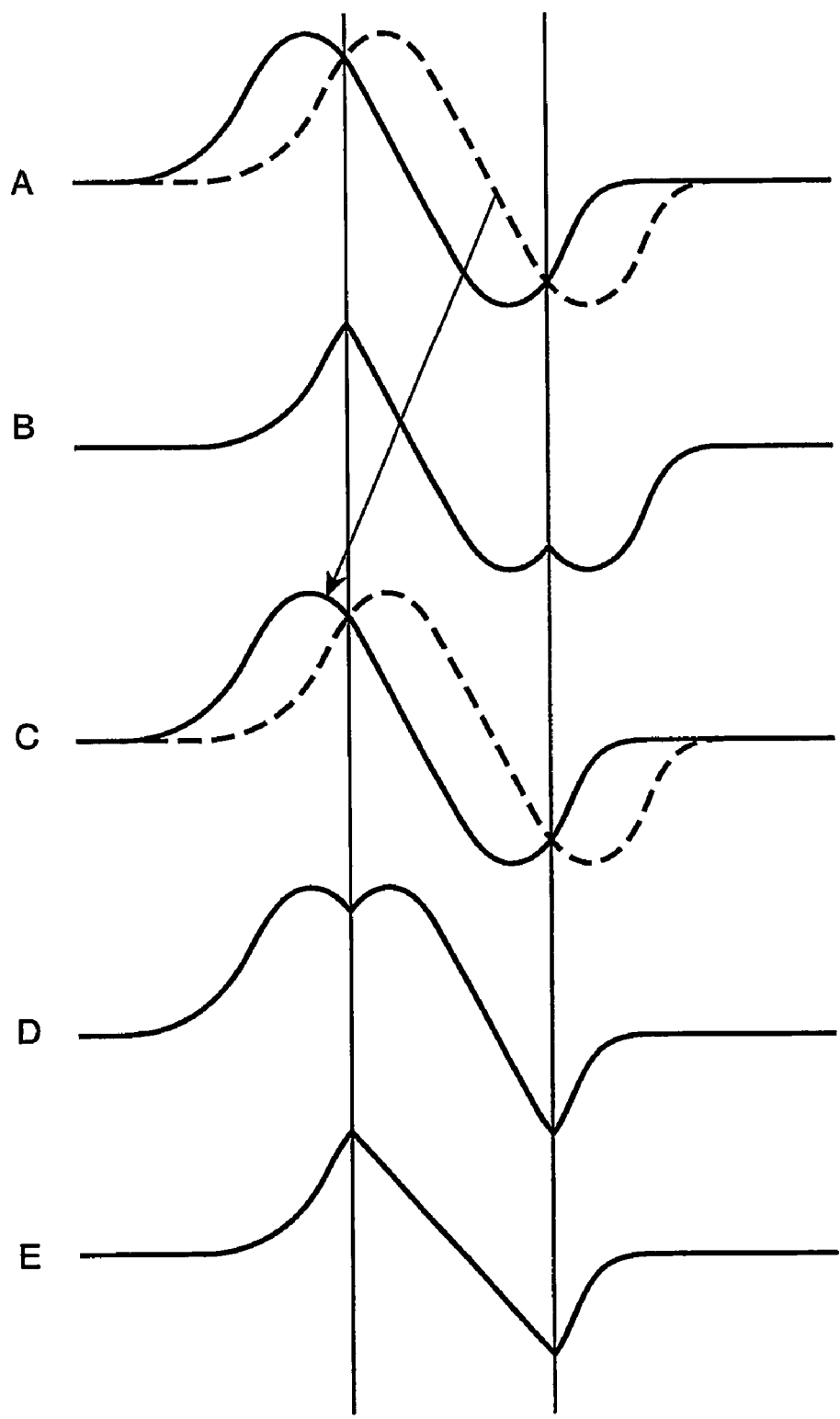
FIG._3

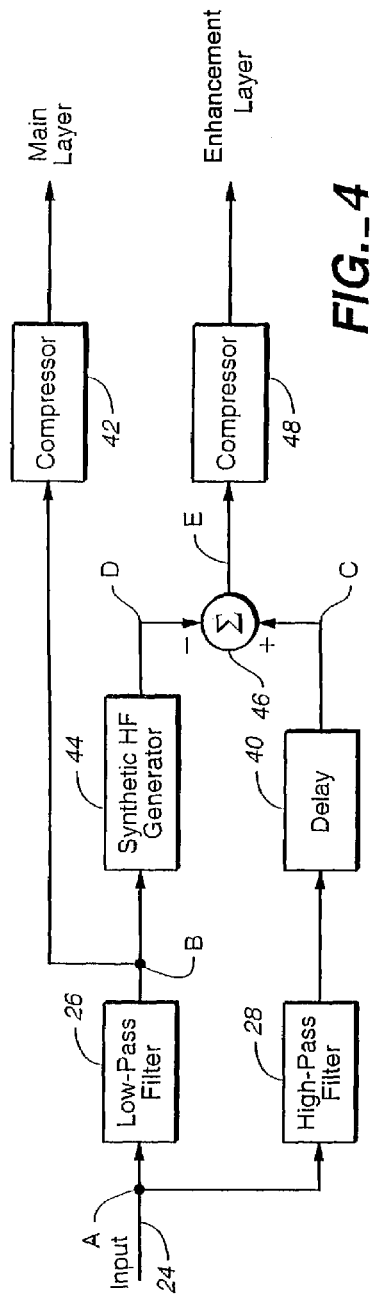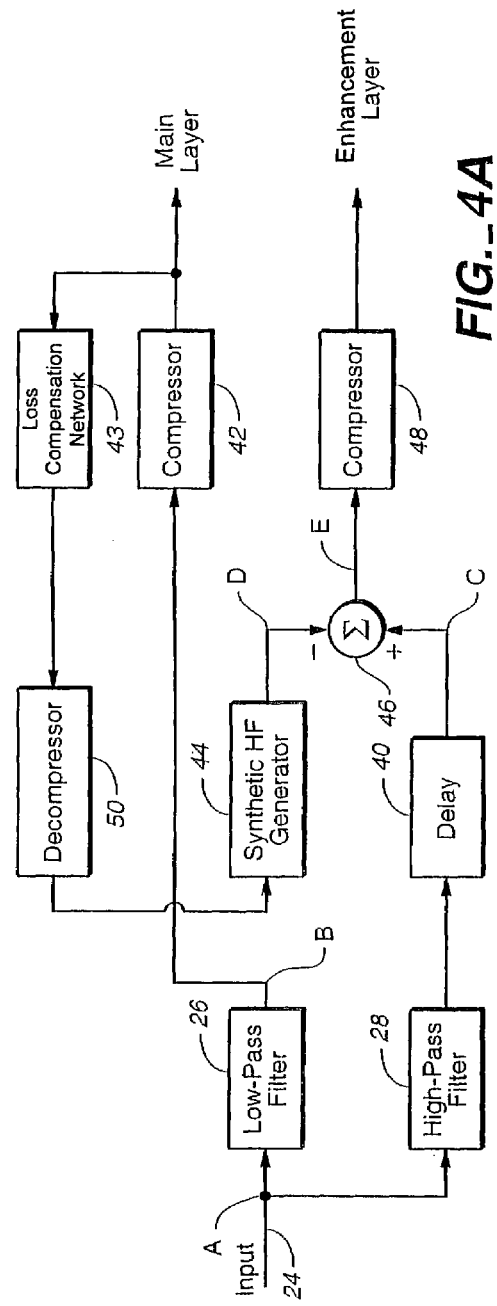

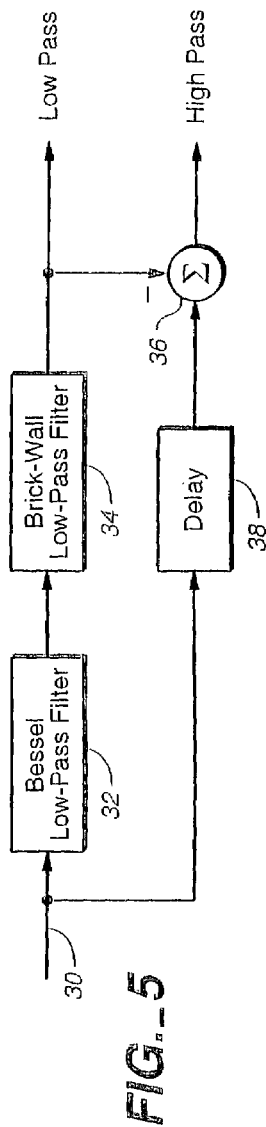
FIG._5
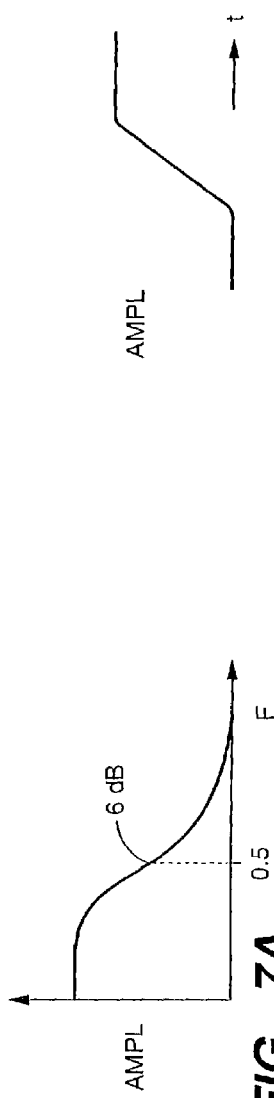
FIG._7A
FIG._7B
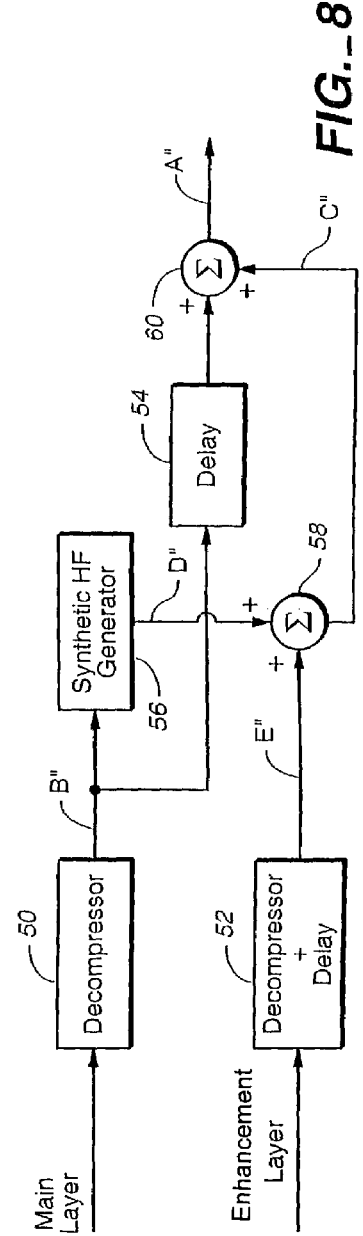
FIG._8

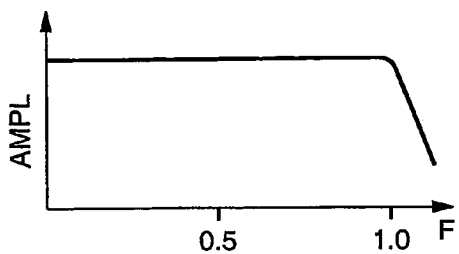
FIG._6A
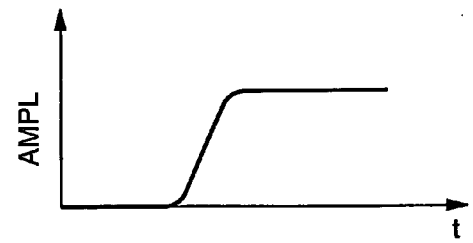
FIG._6A'
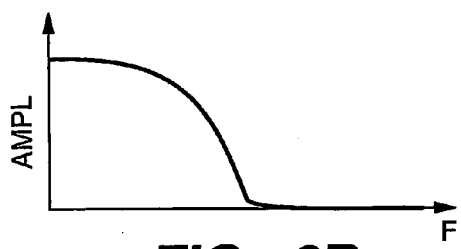
FIG._6B
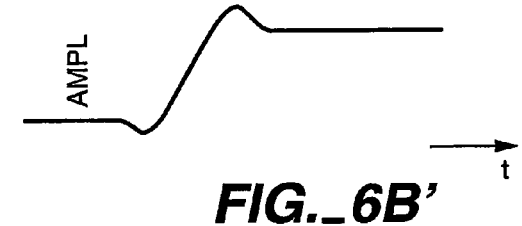
FIG._6B'
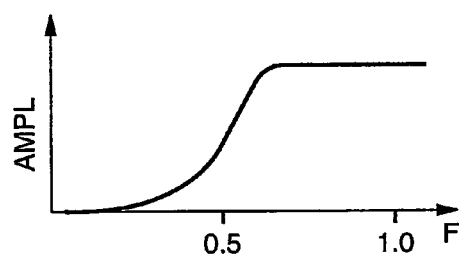
FIG._6C
FIG._6C'
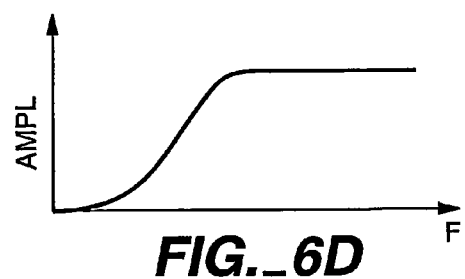
FIG._6D
FIG._6D'
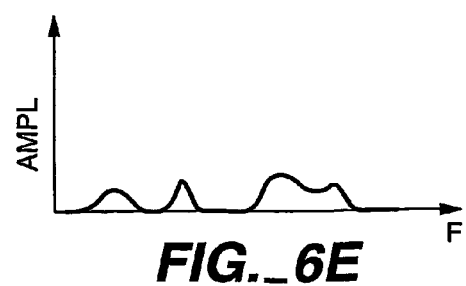
FIG._6E
FIG._6E'

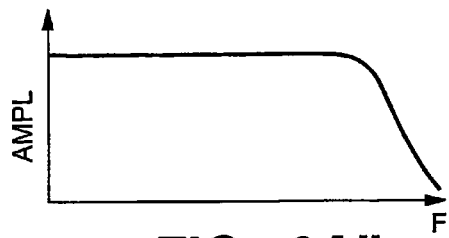
*FIG._9A"*
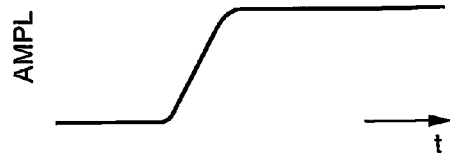
*FIG._9A'''*
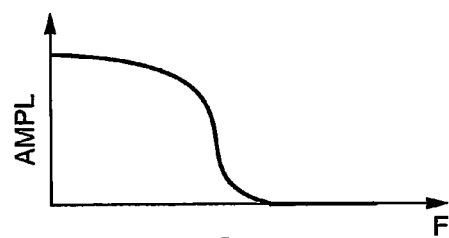
*FIG._9B"*
*FIG._9B'''*
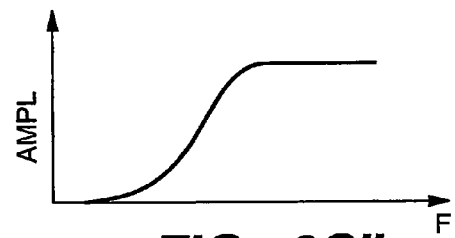
*FIG._9C"*
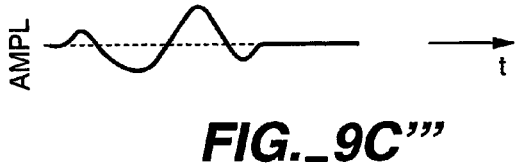
*FIG._9C'''*
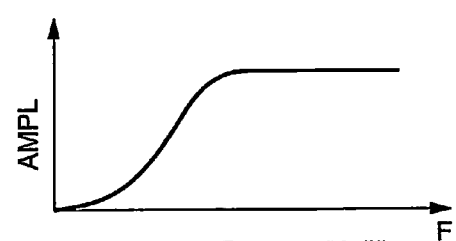
*FIG._9D"*
*FIG._9D'''*
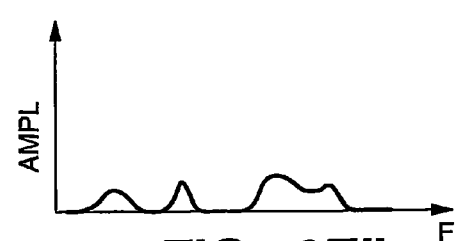
*FIG._9E"*
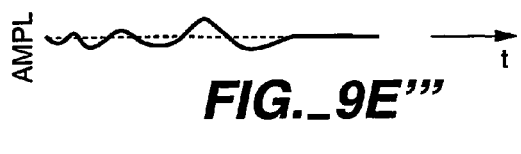
*FIG._9E'''*

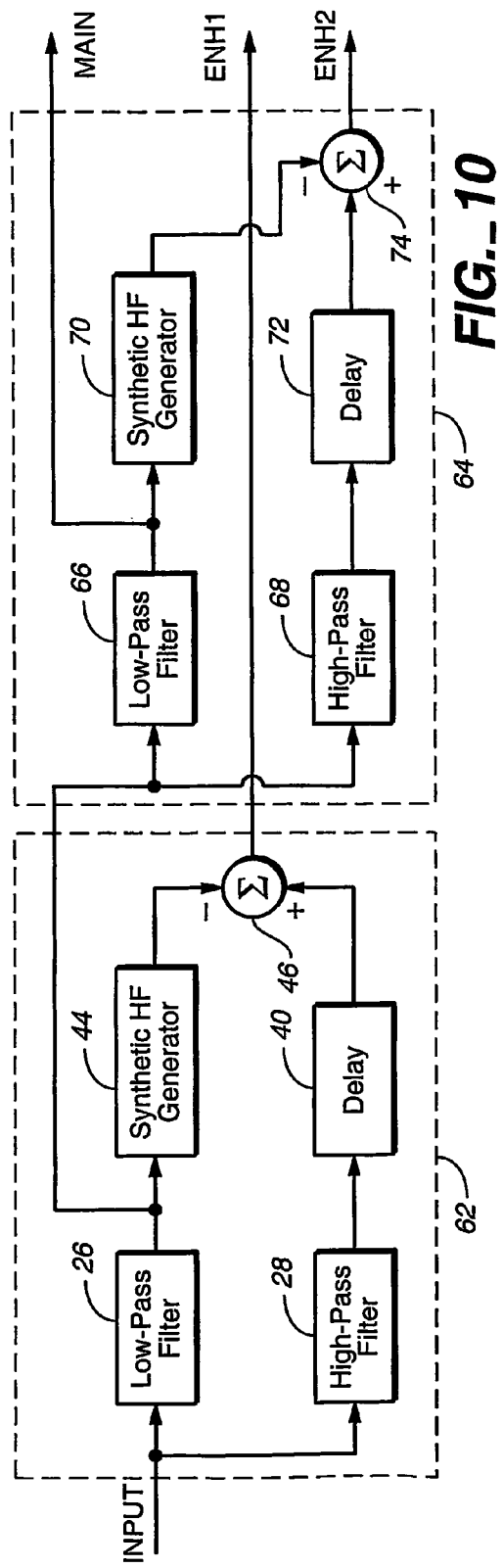
FIG._10
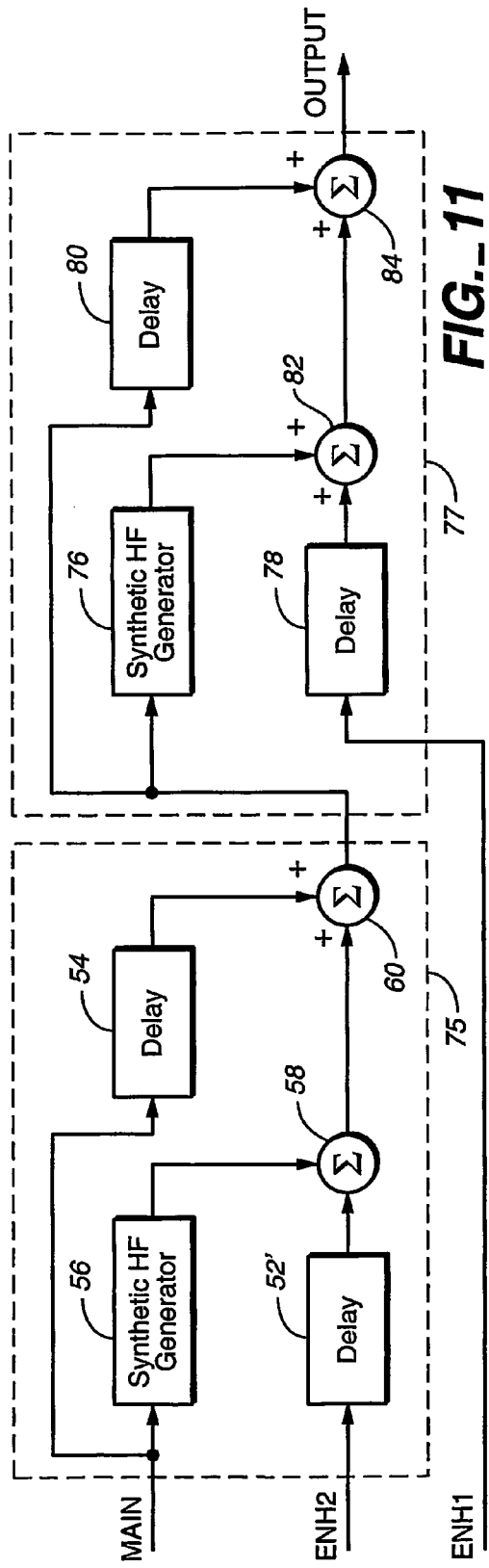
FIG._11

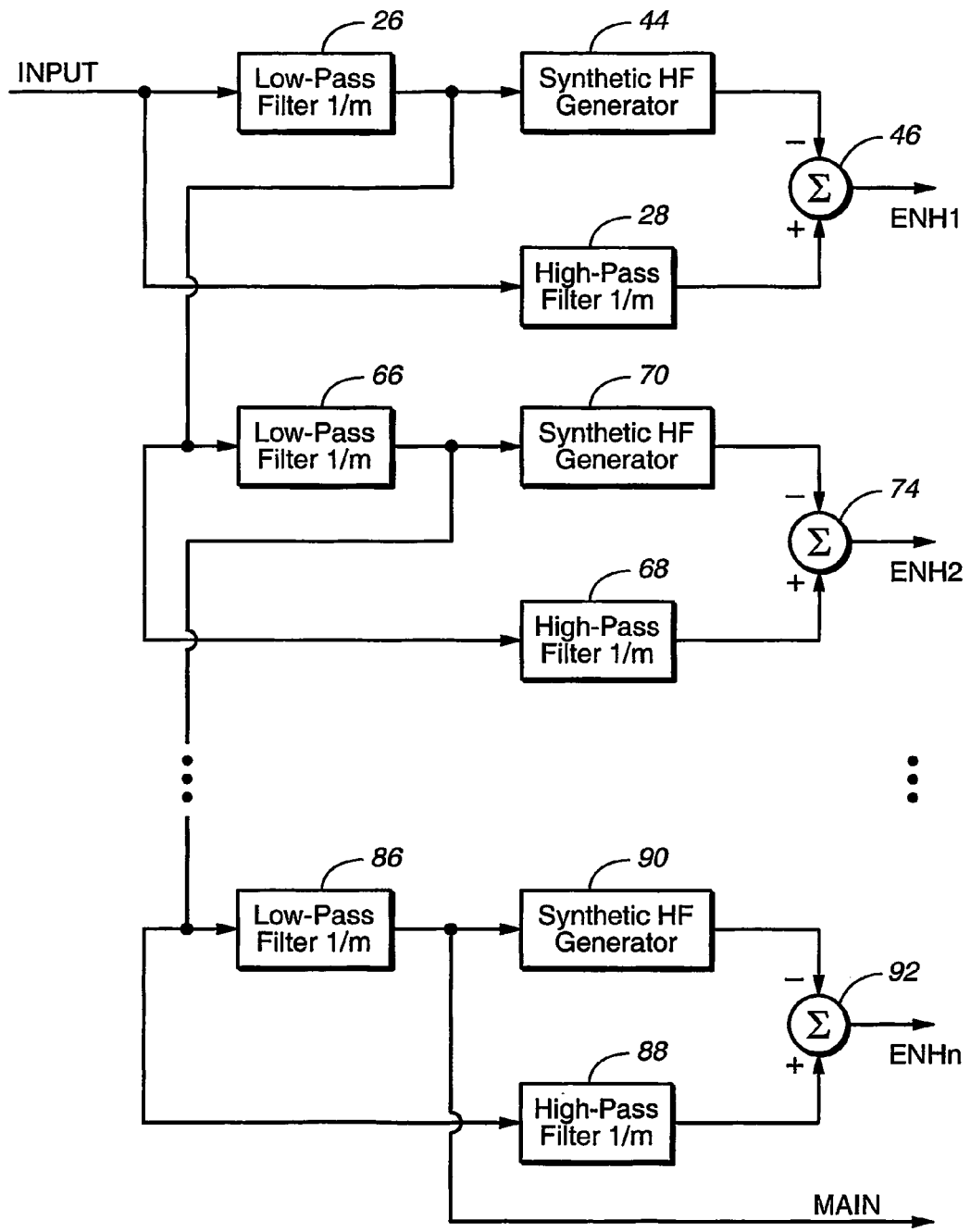
FIG._12

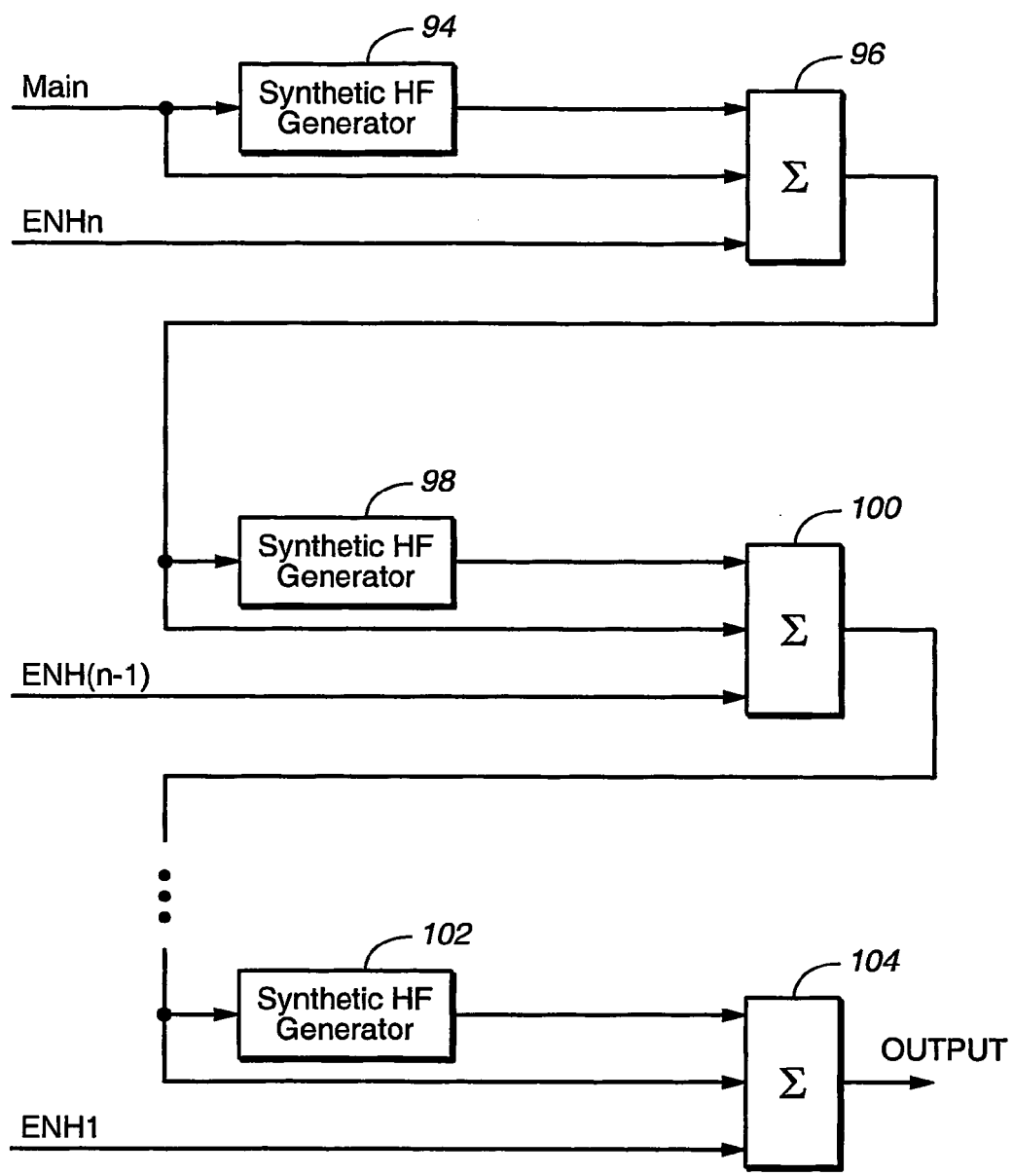
FIG._13

MULTI-LAYER VIDEO COMPRESSION SYSTEM WITH SYNTHETIC HIGH FREQUENCIES

TECHNICAL FIELD

The invention relates to video compression. More particularly, the invention relates to a video compression system, encoder, decoder and method providing a high quality-to-bandwidth performance suitable not only for very low bit rate or very narrow bandwidth applications, including, for example, video on the Internet, but also for high bit rate or wide bandwidth applications, such as high definition television (HDTV) and for applications having bit rates and bandwidths falling between such low bit rate and high bit rate extremes. The invention is applicable to both still and motion video.

BACKGROUND ART

Digital video compression systems have been used with great success for both stationary (JPEG) and moving (MDEG) images, and have found widespread acceptance. Discrete Cosine Transform (DCT) based compression systems such as MPEG-2 have essentially solved the transmission bandwidth problem in the present television broadcast environment by compressing more programs into a given band than their analog counterpart.

However, new needs have arisen for further bandwidth reduction. New markets, such as the Internet and HDTV, require a quantum leap in quality-to-bandwidth ratios. For that purpose, multi-layer compression/transmission schemes have been proposed. These include for example, the arrangements disclosed in the following U.S. Pat. Nos. 5,349,383; 5,408,270; 5,418,571; 5,742,343; 5,852,565; 5,988,863; 6,043,846; 6,052,416; 6,173,013; 6,195,390; and 6,229,850. Each of said patents is hereby incorporated herein by reference, each in its entirety. Typically, such multi-layer (or "multi-path" or "multi-channel" arrangements separate the input signal spectrum into a base layer and one or more enhancement layers. The now-common "layer" terminology reflects the typical digital bitstream environment in which signals that would be carried in separate "paths" or "channels" in analog environments and some digital embodiments are instead carried in the same digital bitstream. A problem with multi-layer processes is that the bit rate or bandwidth of the enhancement layer tends to be too high to justify the modest reduction in bit rate or bandwidth achieved and the increase in the complexity of the encoder and decoder.

The use of non-linear enhancement techniques for improving the apparent resolution of a video display is well known. Prior art disclosing such techniques includes a 1951 journal article: "A New Technique for Improving the Sharpness of Television Pictures," by Goldmark et al, *Proc. of the I.R.E.*, October 1951, pp. 1314-1322; and a number of United States patents, including, for example: U.S. Pat. Nos. 2,740,071; 2,851,522; 4,030,121; 4,504,853; 5,014,119; 5,151,783; 5,237,414; 5,717,789; 5,805,741; 5,844,617; 5,940,141; and 6,108,453. Each of said patents is hereby incorporated herein by reference, each in its entirety. A general principle of such techniques is to generate harmonics of spectral components of a television signal in a controlled fashion in order to extend its high-frequency spectrum. Such techniques may be employed in both the horizontal and vertical picture domain. For example, a typical non-linear enhancement technique detects a transition, extracts the high frequencies defining the rise time of such transition, and performs a controlled harmonic distortion on these frequencies in order to create higher frequencies to be added to the original signal in order to simulate a wider spectrum and provide viewers the illusion of wider bandwidth and greater resolution.

FIGS. 1A and 1B illustrate in the time and frequency domains, respectively, the operation of one type of spectrum expander or spectrum expander function. An input transition of limited bandwidth is enhanced by the addition of an enhancement signal. An output transition is produced which has a significantly increased bandwidth. In the example of FIG. 1B, the input transition has a frequency spectrum extending to F0, whereas the expanded output transition has a frequency spectrum extending to F1. In practice, a ratio of about two is usable for spectral expansion in the frequency domain in the context of the present invention. As indicated below, the ratio is not critical to the invention.

A spectrum expander or spectrum expander function may be implemented in any one of a number of ways, either in the analog or the digital domain. The manner in which the spectral expander is implemented is not critical to the invention. As a first example, the expander or expander function may be implemented as shown in FIG. 1C. In this arrangement, a first differentiator or differentiator function 4 is connected to an input 2 and differentiates the incoming transition (waveform A of FIG. 1E) and puts out the differential (waveform B of FIG. 1E) on a path 6. A full wave rectifier or rectifier function 8 removes the sign of the differential and puts out an absolute value enhancement signal over a path 10 to a multiplier or multiplier function 12. At the same time, a second first differentiator or differentiator function 14 receives the differentiated signal put out on the path 6 from the first differentiator or differentiator function 4. A twice-differentiated signal is then put out on a path 16, e.g., to an amplifier-limiter circuit or function 18 which amplifies and limits positive and negative excursions of the double-differentiated signal and puts out a multiplier-gating signal (waveform C of FIG. 1E) on a path 20 to the multiplier or multiplier function 12. The resultant signal put out from the multiplier or multiplier function 12 on the path 22 is a signal transition having a sharply shortened duration (waveform D of FIG. 1E). FIG. 1D illustrates an alternate arrangement for the spectrum expander or expander function in which the rectifier or rectifier function 8 is placed in the path between the upstream differentiator or differentiator function 4 and the downstream differentiator or differentiator function 14. These illustrations of FIGS. 1C and 1D are applicable to horizontal domain processing and are readily extrapolated to processing in the vertical domain. The techniques described in the present inventor's prior U.S. Pat. No. 4,030,121 are examples of these two approaches of FIG. 1.

Other implementations of the spectrum expander circuit or function may employ, for example, gating techniques as functionally illustrated by the graphs of FIG. 2. The original transition (graph A of FIG. 2) is processed into a second differentiation signal (graph B of FIG. 2) as used in aperture correction for example. As shown in graph C of FIG. 2, when the differentiation signal is combined with the original transition, large preshoot (PS) and overshoot (OS) components are added to the transition and the enhanced transition is too long.

The gating approach takes the aperture correction waveform of graph B of FIG. 2 and develops a gating signal as shown in graph D of FIG. 2. The graph signal D is positioned to be centered at the zero crossing of graph B, and gating of graph B by graph D results in an enhancement waveform, graph E of FIG. 2, which does not have preshoot or overshoot. This signal is then combined with the original transition to produce an enhanced transition graph F of FIG. 2. The gating approach illustrated in FIG. 2 is particularly efficient for spectrum expansion in the vertical domain.

Another approach employs a time delay. A second differentiation of the incoming transition is obtained as shown in FIG. 2B. This signal is graphed as graph A of FIG. 3. This signal is then delayed by a predetermined delay D in a delay line or function. An undelayed component, graph A of FIG. 3 is then compared with a delayed component in an amplitude comparator circuit or function, and a lesser-valued signal is selected and put out from the comparator or comparator function, as graphed in graph B of FIG. 3. The process is repeated for the higher-valued signal as shown in graphs C and D of FIG. 3. Waveform B is delay matched and then compared with waveform D in a comparator circuit. The output of the comparator is composed of the portions of signals B and D having the lesser absolute value of graph B (delayed) and graph D. The resultant is a spectrum expansion signal and is shown as graph E of FIG. 3. This signal is then combined in proper sign, phase and amplitude with the original transition to obtain a resultant having a shortened transition duration.

Another approach is the one proposed by Goldmark et al. in the above-cited journal article. While these techniques build upon a second differentiation of the incoming transition waveform, (a signal necessarily limited by the bandwidth of the incoming signal), the resultant is an enhancement signal which is shorter in time than the original and which has frequency components which are higher than the original transition. Although these techniques are herein described for applications in the horizontal domain (for reasons of simplicity) they can easily be applied in the vertical domain in order to reduce as well vertical domain transitions rise times and give to the image the appearance of a high vertical resolution. In U.S. Pat. No. 5,940,141, a form of vertical bandwidth expansion is utilized.

Analog and digital techniques may be used for bandwidth expansion, although digital approaches are now more practical.

Although such non-linear enhancement techniques have been very successful for video displays, they have not been employed for image processing within systems. The reason is that synthetic high frequencies can only approximate wider bandwidth, and there are many cases when the approach fails. For example, shortcomings of non-linear enhancement include:

Small details, with an entire spectrum above the upper limit of the original signal, have disappeared and cannot be recreated.

Ringing artifacts (e.g. pre-shoots and overshoots) should not be enhanced, and sometimes are.

The amplitudes of the synthetic high frequencies do not necessarily track perfectly the amplitude of the transitions.

Synthetically generated high frequency components most closely match the naturally occurring high frequency components when the non-linear enhancement is optimized for a particular transition rise time. However, transition rise times vary, resulting from, for example, different sources, background purposely out of focus while foreground is in focus, etc., and matching is not necessarily perfect in all cases.

Multiple, repeated transitions (parallel lines) are not very common, but, when present, are not well processed by synthetic high-frequency generators.

For all these reasons, and others, synthetic high frequencies rarely duplicate real high frequencies, but only approximate them. This approximation, however, can be very good, and the difference between synthetic and real high frequencies is large only from time to time and only in certain picture conditions.

DISCLOSURE OF THE INVENTION

In accordance with the present invention, non-linear enhancement techniques are combined with multi-layer compression techniques in such a way that the one or more enhancement layers of a multi-layer video compression arrangement have a significantly reduced bandwidth or bit rate and the disadvantages of non-linear enhancement are obviated while providing a substantially improved video quality for a given bandwidth or bit rate.

The present invention provides a multi-layer compression technique in which high compression ratios are obtained. A base layer is derived from an input signal by low-pass filtering, preferably bi-dimensionally in the horizontal and vertical domains but, alternatively, only in the horizontal domain or only in the vertical domain. One or more high-frequency, or "enhancement" layers are derived by subtraction of synthetic high-frequency signal components resulting from the controlled harmonic distortion of the low-pass filtered base layer from the actual high-frequency signal components resulting from (preferably complementary) bi-dimensional high-pass filtering of the input signal.

Transmitting the difference between synthetic high-frequency signal components and the actual high-frequency signal components requires less bandwidth or fewer bits than transmitting the actual high-frequency components. Thus, the invention results in a multi-layer compression scheme in which the one or more enhancement layers has a very low bandwidth or bit rate (the enhancement layer or layers only carry an error signal that is the difference between the synthetic and actual high-frequency components—this difference is small for typical signal conditions) while also overcoming the disadvantages of using synthetic high-frequency components (the actual high-frequency signal components are reconstructed by the decoder so that the output does not contain synthetic high-frequency components).

The base layer and the enhancement layer are separately encoded and decoded using a suitable video compression system, preferably lossless or quasi-lossless, and a faithful reproduction of the input signal is obtained after decoding, with a significant reduction in bit rate compared to conventional compression systems. The choice of the video compression system is not critical to the invention.

A hierarchy of enhancement layers may be used if a greater compression ratio is required.

This invention may be used in conjunction with time-domain processing, such as time-domain interpolation and time-domain layering for temporal bit rate reduction.

This invention may also be used in conjunction with conventional pre-and post-processing such as de-interlacing and noise reduction at the input, and enhancement at the output.

DESCRIPTION OF THE DRAWINGS

FIG. 1A comprises three idealized graphs progressively illustrating a spectrum expansion function along a common time base axis.

FIG. 1B comprises two idealized frequency domain representations of the FIG. 1A expansion.

FIG. 1C is an example of a first arrangement for generating a spectrum expansion signal of the type graphed in FIG. 1B.

FIG. 1D is an example of a second arrangement for generating the FIG. 1B spectrum expansion spectrum.

FIG. 1E is a series of idealized waveforms illustrating operation of the FIGS. 1C and 1D circuits or functions.

FIG. 2 is a series of idealized waveform graphs illustrating a gating methodology for generating a spectrum expansion enhancement signal from a transition in a video signal stream.

FIG. 3 is a series of idealized waveform graphs illustrating a delay method for generating a spectrum enhancement signal from a transition in a video signal stream.

FIG. 4 shows a conceptual and functional block diagram of an encoder or encoding process embodying aspects of the present invention in a two-layer compression arrangement.

FIG. 4A shows a conceptual and functional block diagram of an encoder or encoding process embodying aspects of the present invention in a two-layer compression arrangement in which better matching between encoder and decoder may be obtained FIG. 5 is a conceptual and functional block diagram showing one suitable configuration for obtaining low-pass and high-pass filtered versions of the input video signal.

FIG. 6 shows a series of idealized waveforms useful in understanding the encoder or encoding process of FIG. 4

FIG. 7A is an idealized waveform showing the input video signal spectrum when applied only to a Bessel low-pass filter or filtering function.

FIG. 7B is an idealized waveform showing the result of applying a transient, as in FIG. 6A, to the Bessel low-pass filter or filtering function having the response shown in FIG. 7A.

FIG. 8 shows a conceptual and functional block diagram of a decoder or a decoder function embodying aspects of the present invention in a two-layer compression arrangement.

FIG. 9 shows a series of idealized waveforms useful in understanding the decoder or decoder function of FIG. 8.

FIG. 10 shows a conceptual and functional block diagram of an encoder or an encoder function embodying aspects of the present invention in a three-layer compression arrangement.

FIG. 11 shows a conceptual and functional block diagram of a decoder or a decoder function embodying aspects of the present invention in a three-layer compression arrangement.

FIG. 12 shows a conceptual and functional block diagram of an n-layer encoder or encoding process.

FIG. 13 shows a conceptual and functional block diagram of an n-layer decoder or decoding process.

BEST MODE FOR CARRYING OUT THE INVENTION

FIG. 4 shows a conceptual and functional block diagram of an encoder or encoding process embodying aspects of the present invention in a two-layer compression arrangement. For simplicity, the figure and discussion describes the processing of a monochrome video signal (still or motion), however, the invention applies also to the processing of still or motion color video signals (in which case, three processing channels may be employed, for luminance and the two color components, respectively) (for color channels, some advantages are gained if the wider bandwidth, luminance channel is used as a transitional reference for a non-non-linear, controlled harmonic distortion, enhancement process).

The input video signal stream at input 24 is applied to a low-pass filter or filtering function 26 having a corner frequency nominally at half the bandwidth of the input signal spectrum. Preferably, the filtering is two-dimensional (i.e., horizontal and vertical) but, alternatively, the filtering may be only in the horizontal domain or only in the vertical domain. The input video signal is also applied to high-pass filter or filtering function 28 having a corner frequency nominally at half the input bandwidth of the input signal. The low-pass and high pass filters or filtering functions should operate in the same dimensional domains (i.e., all two-dimensional, all horizontal, or all vertical). Preferably, the low-pass and high-pass filters' or filtering functions' characteristics are complementary to each other. It is not critical to the invention to divide the input spectrum into two equal spectra having the same bandwidth. As an example, it is possible to choose a low-end spectrum equal to ⅔ of the input spectrum, and a high-end spectrum equal to ⅓ of the input spectrum, thus making less demands on the quality of the spectral expansion at the expense of bit rate reduction.

One suitable configuration for obtaining low-pass and high-pass filtered versions of the input video signal is shown in FIG. 5. The input video signal stream at input 30 is applied to the series combination of a two-dimensional low-pass filter or filtering function 32 having a Bessel characteristic and a two-dimensional low-pass filter or filtering function 34 having a "brick wall" (i.e., very sharp or abrupt with a highly attenuated stopband and a reasonably flat passband) characteristic. The output of filter or filtering function 34 is the desired low-pass filtered version of the input video signal. That output is subtractively combined in a linear combiner or combining function 36 from aversion of the input video signal that is time delayed in a delay 38 by an appropriate time substantially equal to the combined delays of filters or filtering functions 32 and 34 in order to provide substantial time alignment of the signals at the combiner. The output of the combiner or combining function 36 is the desired high-pass filtered version of the input video signal, wherein the high-pass filtering preferably is complementary to the low-pass filtering.

FIG. 6 shows a series of idealized waveforms useful in understanding the encoder or encoding process of FIG. 4. FIGS. 6A-6E depict idealized versions in the frequency domain of the envelopes of signal spectra at locations A through E of FIG. 4. In each of FIGS. 6A-6E, the horizontal axis is frequency and the vertical axis is amplitude. FIGS. 6A'-6E" depict the waveforms in the time domain that occur at locations A through E, respectively, when a transient in the video input signal occurs (FIG. 6A' depicts a signal transient having a transition as shown). The horizontal axis is time and the vertical axis is amplitude.

Returning to the description of FIG. 4 and relevant portions of FIG. 6, the spectrum of the input video signal (FIG. 6A) is substantially cut in half (or some other division ratio) by the effect of the low-pass filter or filtering function 26 when configured as series Bessel and brick wall low-pass filters or filtering functions in the manner of FIG. 5. A transient in the input video signal stream, shown in FIG. 6A' results in the waveform of FIG. 6B' when processed by the low-pass filters, causing some ringing. For comparison, the input video signal spectrum when applied only to a Bessel low-pass filter or filtering function is shown in FIG. 7A. The same transient applied only to the Bessel low-pass filter or filtering function has substantially no ringing as is shown in FIG. 7B. A brick-wall filter taken alone would provide a desirable separation of the frequency bands (to minimize artifacts resulting from violations of Nyquist sampling requirements) but would have substantial ringing. While a Bessel filter taken by itself would have no ringing, there would be more leakage between frequency bands, potentially causing Nyquist sampling artifacts. The arrangement of series filters is a practical compromise that provides a good division between frequency bands while minimizing ringing.

Returning again to the description of FIG. 4 and relevant portions of FIG. 6, the output of the complementary high-pass filter or filtering function 28 and a delay or delay function 40 that follows it is shown at FIG. 6C. Delay or delay function 40 is for the purpose described above in connection with delay or delay function 38 in FIG. 5. The transient, when processed by the high-pass filter or filter function appears as shown in FIG. 6C'. If summed, the transient outputs of the low-pass filter or filtering function 26 and the high-pass filter or filtering function 28 and delay or delay function 40 would yield the original transient of FIG. 6A'. If summed, the transient outputs of the low-pass filter or filtering function 26 and the high-pass filter or filtering function 28 would yield the original transient of FIG. 6A'. The output of low-pass filter or filtering function 26 provides the main or base layer output. When the low-pass filter or filtering function is bi-dimensional, the main or base layer has one-fourth the bandwidth of the input video signal. One-dimensional, horizontal domain only or vertical domain only filtering would result in one-half the bandwidth of the input video signal. Thus, bi-dimensional filtering provides greater data reduction. The base layer may then be applied to a suitable compressor or compression function 42, preferably providing a type of quasi-lossless compression such as a type of MPEG video compression. The low-pass filter or filtering function 26 output is also applied to a non-linear enhancer or non-linear enhancer function 44. By utilizing only the output of low pass filter 26, the enhancer or enhancer function 44 generates synthetic or artificial high frequency signal components, in both horizontal (H) and vertical (V) dimensions, which, if properly added to the output of block 26, would reasonably approximate the input signal (26) spectrum. The configuration of enhancer or enhancer function 44 is not critical and may be any arrangement, whether in the analog or digital domain, that provides the desired function (including those described above and in the above cited journal article reference and patent references). Although the examples set forth above and in the cited references accomplish non-linear enhancement by techniques that may be characterized as operating in the time domain, the artificial generation of high frequency signal components may also be accomplished by techniques that may be characterized as operating wholly or partly in the frequency domain, including, for example, transform techniques.

The envelope of the spectral output of enhancer or enhancer function 44 is shown in FIG. 6D. Desirably, the FIG. 6D spectral envelope is substantially the same as the high-pass filter spectral envelope of FIG. 6C.

The transient when processed by the enhancer or enhancer function 44 appears as shown in FIG. 6D'. It is desired that the waveform of the transient as processed by the enhancer or enhancer function 44 (FIG. 6D') be as close as possible to the waveform of the transient as processed by the high-pass filter or filter function 28 and delay or delay function 40 (FIG. 6C'). The output of enhancer or enhancer function 44 is subtractively combined with the high-pass filtered and delayed output of delay or delay function 40 in a linear combiner or combining function 46 to provide the enhancement layer output whose spectral envelope is shown in FIG. 6E (the "error spectrum"). The time-domain waveform resulting from the transient signal input of FIG. 6A' results in the error waveform shown in FIG. 6E'. The enhancement layer may then be applied to a compressor or compression function 48, preferably a type of quasi-lossless compression such as a type of MPEG video compression. In practical implementations, the same type of compression may be applied to both the base layer and the enhancement layer signals. The compressed main layer and enhancement layer may be applied to any desired recording or transmission media. Alternatively, FIG. 4A describes a configuration where better matching between encoder and decoder may be obtained. The input of the enhancer 44 is fed by the output of a decompressor 50 (identical to decompressor 50 of FIG. 8) whose input is fed by the compressor 42 via a loss compensation network 43, which simulates the degradation of the quantizing and transmission processes occurring between coder and decoder.

FIG. 8 shows a conceptual and functional block diagram of a decoder or a decoder function embodying aspects of the present invention in a two-layer compression arrangement. For simplicity, as in the case of the FIG. 4 encoder or encoding process, the figure and discussion describes the processing of a monochrome still or motion video signal, however, the invention applies also to the processing of color still or motion video signals (in which case, three processing channels or layers may be employed, for luminance and the two color components, respectively).

FIG. 9 shows a series of idealized waveforms useful in understanding the decoder or decoder function of FIG. 8. FIGS. 9A"-9E" depict idealized versions in the frequency domain of the envelopes of waveforms at locations A" through E" of FIG. 9. In each of FIGS. 9A"-9E", the horizontal axis is frequency and the vertical axis is amplitude. FIGS. 9A'''-9E''' depict the waveforms in the time domain that occur at positions A" through E", respectively, when a transient in the video input signal of the encoder or encoder process of FIG. 4 occurs (see FIG. 6A'). In FIG. 9, the horizontal axis is time and the vertical axis is amplitude.

Returning to the description of FIG. 8 and relevant portions of FIG. 9, the main or base layer input to the decoder or decoder function (received from a recording or transmission medium) is applied to a decompressor or decompression function 50. The decompressor or decompression function 50 provides the matching decoding for the compression applied to the main layer in the encoder or encoder process of FIG. 5. FIG. 9B" shows the envelope of the spectrum of the signal at point B", the output of the decompressor or decompression function 50. FIG. 9B'''shows the time domain waveform at point B" resulting from a transient applied to the encoder or encoding process input (FIG. 6A'). For the case of lossless or quasi-lossless coding and decoding, the spectrum at B" should be substantially the same as the spectrum at point B in the encoder and the waveform B''' should be substantially the same as the waveform B' in the encoder or encoding process.

The enhancement layer input to the decoder is applied to a decompressor and delay or a decompression and delay function 52. The decompressor or decompression function portion of block 52 provides the matching complementary decoding for the compression applied to the main layer in the encoder or encoding process of FIG. 4. FIG. 9E" shows the envelope of the spectrum of the signal at point E", the output of the decompressor or decompression function and delay or delay function 52. FIG. 9E''' shows the time-domain waveform at point E'' resulting from a transient applied to the encoder or encoding process input (FIG. 6A'). For the case of lossless or quasi-lossless coding and decoding, the spectrum at E'' should be substantially the same as the spectrum at point E in the encoder or encoding process and the waveform E''' is substantially the same as the waveform E' in the encoder or encoding process.

The decompressed main layer signal (B'') is applied to a delay or delay function 54 and to a non-linear enhancer or enhancer function 56, which should be substantially the same in its action as the non-linear enhancer 44 of the encoder or encoding process. FIG. 9D'' shows the envelope of the spectrum of the signal at point D'', the output of the enhancer or enhancer function 56. FIG. 9D''' shows the time-domain waveform at point D'' resulting from a transient applied to the encoder or encoding process input (FIG. 6A'). The decompressed and delayed enhancement layer signal (E'') is additively combined in a linear combiner or combining function 58 with the output of block 56. FIG. 9C'' shows the envelope of the spectrum at point C'', the output of the additive combiner or combining function 58. The spectrum should be substantially the same as the spectrum at point C of the encoder or encoding process. FIG. 9''' shows the time-domain waveform at point C'' resulting from a transient applied to the encoder or encoding process input (FIG. 6A). The waveform should be substantially as the encoder or encoding process waveform of FIG. 6C'. The output of the combiner or combining function 58 is additively combined in a linear combiner or combining function 60 with the output of delay or delay function 54 to provide the decoded output at point A''. The envelope of the waveform at point A'' should be essentially the same as the envelope of the waveform at point A, the input to the encoder or encoding function. Similarly, the time-domain waveform of the decoded output resulting from a transient at the encoder or encoding process input (FIG. 9A''') should be substantially the same as the time-domain waveform at the encoder or encoding process input (FIG. 6A'). The time delay provided by delay or delay function 54 and the time delay provided by the delay in the decompressor and delay or decompression function and delay function 52 compensate for the delay or delay function 40 in the encoder or encoding process in order to bring the signals back into time alignment for their summation in the output combiner or combining function 60 to provide an output signal substantially the same as the input signal to the encoder or encoding process.

The invention is applicable not only to two layer arrangements, such as just described, but also to three layer or, more generally, n-layer systems. FIGS. 10 and 11, respectively, show an encoder or encoding process and a decoder or decoding method of a three-layer system. In FIGS. 10, 11 and 12, elements or functions corresponding to those in FIGS. 4 and 8 are shown using the same reference numerals. FIG. 12 shows a portion of an encoder or encoding process of an n-layer system. For simplicity in presentation, lossless or quasi-lossless compression and decompression is not shown in FIGS. 10-12 nor are delays shown in FIG. 12.

Although in the examples of FIGS. 10-12, the cascaded stages all have the same compression factor, it is not critical to the invention that they have the same compression factor. It may be desirable, in practice, to have a lower compression factor for the last cascaded enhancement stages (enhancement 2 in FIG. 10) and for the main layer, as the cost in overall bandwidth is low for having a significant improvement in image quality.

The encoder or encoding process of FIG. 10 is configured as two cascaded stages, each of which has essentially the same function as the encoder or encoding process of FIG. 4. The main or base layer output of the first stage 62, which has a bandwidth nominally one-quarter of that of the input, is applied to a second stage 64 that is configured essentially in the same manner as the first stage. What was the enhancement layer output of the encoder or encoding process of FIG. 4 is a first enhancement layer output, the "ENH 1" layer output of the encoder or encoding process of FIG. 10. In the second stage 64: the low-pass filter or filtering function 66 corresponds to block 26 in the first stage; the high pass filter or filtering function 68 corresponds to block 28 in the first stage; the non-linear enhancer or enhancement function 70 corresponds to block 44 in the first stage; the delay or delay function 72 corresponds to block 40 in the first stage; and the linear combiner or combiner function 74 corresponds to element 46 in the first stage. The output of combiner or combining function 74 in the second stage 64 provides a second enhancement layer output, "ENH 2". The overall main or base layer output of the three-layer encoder or encoding process of FIG. 10 is taken from the output of the low-pass filter 66 of the second stage 64. The nominal bandwidth of the base layer output of each stage is one-fourth of the input to the stage when the low-pass filter is bi-dimensional and has a cutoff frequency at about half the bandwidth of the input signal. Thus, with respect to the second stage 64, the input to the second stage is already one-fourth of the bandwidth of the main input to the first stage. Consequently, the nominal bandwidth of the base layer output from the second stage is one-sixteenth of the main input signal bandwidth for the case of bi-dimensional low-pass filters having a cutoff frequency at about half of the bandwidth of their input signals.

The decoder or decoding process of FIG. 11 is configured as two cascaded stages, each of which may be essentially the same the decoder or decoding process of FIG. 8. The main or base layer input and second enhancement layer (ENH2) input are applied to the first decoding stage 75, the main, input being applied to the non-non-linear enhancer or enhancement function 50 and to delay or delay process 56. The ENH2 input is applied to delay or delay function 52' (block 52' differs from block 52 of FIG. 4 in that it includes only a delay or delay function and does not include a decompressor or decompression function because this is a simplified block diagram). In the second decoder stage 77, non-linear enhancer or enhancement function 76 corresponds to block 50 in the first stage, delay or delay function 78 corresponds to block 52' in the first stage, delay or delay function 80 corresponds to block 56 in the first stage, combiner or combining function 82 corresponds to element 58 in the first stage, and combiner or combining function 84 corresponds to element 60 in the first stage. The ENH1 input is applied to delay or delay function 78. The overall output of the cascaded decoder stages is taken from the output of the combiner or combining function 84.

It will be apparent that as additional stages are cascaded in series, that the overall base or main layer output is reduced by multiplying together the bandwidth reductions of each stage. Thus, an n-stage encoder or encoding process in which each stage has a bandwidth reduction factor of $1/m$ has an overall bandwidth reduction of $1/m^n$. FIG. 12 shows an n-layer encoder or encoding process (delays and compression are omitted for simplicity). The blocks in the first two stages correspond to those in the three-stage arrangement of FIG. 10. In the remaining stage shown, stage n, block 86 corresponds to blocks 26 and 66, block 88 corresponds to block 28 and 68, block 90 corresponds to blocks 44 and 70, and element 92 corresponds to elements 46 and 74. FIG. 13 shows an n-layer decoder or decoding process. Delays and decompression are omitted for simplicity. Decompression would be applied, for example, to the main input and to each of the enhancement input signals. Delays would be applied, for example, to the inputs of each combiner or combining function. The inputs to the n-layer decoder include at least a main or base layer representing low-frequency components of a video signal and a first enhancement layer ENH1 representing the difference between synthetic and actual high-frequency components of the video signal. Any further enhancement layer inputs, up to ENHn represent the difference between synthetic and actual high-frequency components of successively smaller bandwidth portions of said low-frequency components. The main or base layer is processed in block 94 to generate a set of synthetic high-frequency components of the main or base layer. A combiner or combining function 96 combines the main or base layer, the set of synthetic high-frequency components, and the only enhancement layer when n=1 or the $n^{th}$ enhancement layer, relating to the smallest bandwidth portion of the video signal, when n>1, to generate an output signal when n=1 or to generate an intermediate signal when n>1. Successive processing and combining, in the order of enhancement layers relating to successively smaller portions of the video signal, when n>1 is accomplished by processing each intermediate signal (blocks 98, 102) to generate a set of synthetic high-frequency components of the intermediate signal, and combining (blocks 100, 104) each successive intermediate signal, the set of synthetic high-frequency components of the successive intermediate signal, and each successive smaller bandwidth enhancement layer, the last successive intermediate signal constituting an output signal.

Although, in principle, any number of stages may be cascaded, the theoretical improvement in bandwidth or bit rate reaches a plateau at about four stages, while three stages may be a practical maximum because of complexity in implementation. Consider, the following numerical example. A 24 frame per seconds, 480×720 pixel signal may be transmitted with a 2 Mb/sec data rate, with present day MPEG-2 compression. In a two-layer system with bi-dimensional filtering, such as described above in connection with FIG. 4, the main or base path output may be reduced by a factor of ¼ to 0.5 Mb/sec. It is estimated that the enhancement path output would have a data rate of 0.2 Mb/sec, resulting in a total data rate of 0.7 Mb/sec for the two output layers—an overall data reduction of 65%. In a three-layer system employing bi-dimensional filtering, such as just described with respect to FIG. 10, the main or base path output may be reduced by an additional factor of ¼ to 0.125 Mb/sec. However, the data rate of the output of the first enhancement path, ENH1, would remain at 0.2 Mb/sec. It is assumed that the data rate of the output of the second enhancement path, ENH2, is reduced by a factor of ¼ compared to that of ENH1, to 0.05 Mb/sec, resulting in a total date rate of 0.375 Mb/sec—an overall date reduction of 81.25%. As additional stages are added in the manner of FIG. 12, the data rate of the first enhancement layer, ENH1, remains at 0.2 Mb/sec, while the data rate of other paths become smaller and smaller in comparison. Beyond four stages, the improvement in data rate is very small and does not merit the additional complexity of the additional stages. Moreover, beyond four stages proper matching between the base and enhancement layers becomes, in practice, very difficult to achieve in order to obtain a good resolution image.

As mentioned above, the multi-layer arrangements according to the present invention preferably employ a type of lossless or quasi-lossless compression and decompression. In the case of a quasi-lossless compression scheme, the DCT transformation has no loss if there is no quantization. Some loss (apparent bandwidth reduction) appears with the usual 8-bit quantization. For a multi-layer system, the cost of increasing the quantization level (in terms of bit rate) decreases with the higher layers (e.g. ENH2, ENH3, etc.) and with the main path, as the bandwidths of the main channel and the high order enhancement channels are low.

The arrangements of FIGS. 10 and 12 may also be modified as per the configuration of FIG. 4A (as opposed to FIG. 4) in order to improve encoder/decoder matching.

The multi-layer arrangements according to the present invention may easily be combined with time domain bandwidth reduction techniques. For interlace signals, highly adaptive de-interlacing (line doubling) prior to multi-layer preprocessing is desirable.

The output signal may easily be enhanced in a multiplicative fashion by edge information, which is available in the decoding block (for example, at point E of FIG. 8). The equivalent of a bandwidth increase of $(1.5)^2$ may then be reached. In the case of the use of non-linear enhancement techniques for improving the apparent resolution of video displays, it has been found that, in practice, an apparent bandwidth improvement by a factor of 1.5 in each dimension (horizontal and vertical) is the maximum that is visually acceptable without observing undesirable artifacts or unnatural effects, such as a "cartoon" or "digitized" look.

Those of ordinary skill in the art will recognize the general equivalence of hardware and software implementations and of analog and digital implementations. Thus, the present invention may be implemented using analog hardware, digital hardware, hybrid analog/digital hardware and/or digital signal processing. Hardware elements may be performed as functions in software and/or firmware. Thus, all of the various elements and functions of the disclosed embodiments may be implemented in hardware or software in either the analog or digital domains.

The invention claimed is:

1. A method of processing a video signal, comprising
separating the video signal into low-frequency and high-frequency components,
processing the low-frequency components of the video signal to generate synthetic high-frequency components,
generating the difference between the synthetic high-frequency components and the actual high-frequency components, said difference comprising an error signal,
wherein said low-frequency components constitute a main or base layer and said error signal constitutes an enhancement layer and further comprising compressing said main or base layer and compressing said enhancement layer, the compressed main or base layer and the compressed enhancement layer comprising encoder outputs, whereby said encoder is a two-layer encoder.

2. A method of processing a video signal, comprising
separating the video signal into low-frequency and high-frequency components,
processing the low-frequency components of the video signal to generate synthetic high-frequency components,
generating the difference between the synthetic high-frequency components and the actual high-frequency components, said difference comprising an error signal, wherein said processing the low-frequency components of the video signal to generate synthetic high-frequency components includes bandwidth expanding in the horizontal and/or vertical domains, the method further comprising separating said low-frequency components into a further set of low-frequency and high-frequency components, processing the further set of low-frequency components to generate a further set of synthetic high-frequency components, said processing including bandwidth expanding in the horizontal and/or vertical domains and generating the difference between the further set of synthetic high-frequency components and the further set of actual high-frequency components, said difference comprising a further error signal, wherein said further set of low-frequency components constitute a main or base layer, said error signal constitutes a first enhancement layer, and said further error signal constitutes a second enhancement layer, the method further comprising compressing said main or base layer, compressing said first enhancement layer, and compressing said second enhancement layer, the compressed main or base layer, die compressed first enhancement layer, and the compressed second enhancement layer comprising encoder outputs, whereby said encoder is a three-layer encoder.

3. A method of processing a video signal, comprising separating the video signal into low-frequency and high-frequency components, processing the low-frequency components of the video signal to generate synthetic high-frequency components, generating the difference between the synthetic high-frequency components and the actual high-frequency components, said difference comprising a first error signal, separating said low-frequency components into a second set of low-frequency and high-frequency components, processing the second set of low-frequency components to generate a second set of synthetic high-frequency components, generating the difference between the second set of synthetic high-frequency components and the second set of actual high-frequency components, said difference comprising a second error signal, separating said second set of low-frequency components into a third set of low-frequency and high-frequency components, processing the third set of low-frequency components to generate a third set of synthetic high-frequency components, and generating the difference between the third set of synthetic high-frequency components and the third set of actual high-frequency components, said difference comprising a third error signal.

4. A method according to claim 3 wherein said processing the low-frequency components of die video signal to generate synthetic high-frequency components, said processing the further set of low-frequency components to generate a further set of synthetic high-frequency components, and said processing the third set of low-frequency components to generate a third set of synthetic high-frequency components, each include bandwidth expansion in the horizontal and/or vertical domain, wherein said third set of low-frequency components constitute a main or base layer, said error signal constitutes a first enhancement layer, second error signal constitutes a second enhancement layer, and said third error signal constitutes a third enhancement layer, the method further comprising compressing said main or base layer, compressing said first enhancement layer, compressing said second enhancement layer, and compressing said third enhancement layer, the compressed main or base layer, the compressed first enhancement layer, the compressed second enhancement layer, and the compressed third enhancement layer comprising encoder outputs, whereby said encoder is a four-layer encoder.

5. A method of processing a video signal, comprising applying the video signal to die input of a series arrangement of n low-pass filters, where n, is a positive whole integer, each successive low-pass filter having a lower cutoff frequency than the preceding low-pass filter in the series, wherein each of said low-pass filters filters in the horizontal and/or vertical dimensions, deriving a main layer signal from the output of the last of said series arrangement of n low-pass filters, applying the video signal to a high-pass filter having a characteristic substantially complementary to the first of said n low-pass filters, processing a signal derived from the output of each of said n low-pass filters to generate respective sets of synthetic high-frequency components, wherein said processing includes bandwidth expansion in the horizontal and/or vertical domain, when n is 2 or greater, applying a signal derived from the output of each of said n low-pass filters to a further high-pass filter, each successive high-pass filter having a characteristic substantially complementary to each of said successive n low-pass filters, to generate respective sets of high-frequency components, and deriving n error signals by taking the difference between each respective set of synthetic high-frequency components and actual high-frequency components derived from the output of the same low-pass filter.

6. A method of processing a main or base layer representing low-frequency components of a video signal and a enhancement layers of a video signal, where n is a whole positive integer, a first enhancement layer representing the difference between synthetic and actual high-frequency components of the video signal and any further enhancement layers representing the difference between synthetic and actual high-frequency components of successively smaller bandwidth portions of said low-frequency components, comprising processing the main or base layer to generate a set of synthetic high-frequency components of the main or base layer, said processing including bandwidth expansion in the horizontal and/or vertical domain, combining the main or base layer, the set of synthetic high-frequency components, and the only enhancement layer when n=1 at the $n^{th}$ enhancement layer, relating to the smallest bandwidth portion of the video signal, when n>1, to generate an output signal when n=1 or to generate an intermediate signal when n>1, successively processing and combining, in the order of enhancement layers relating to successively smaller portions of the video signal, when n>1 by:

processing each intermediate signal to generate a set of synthetic high-frequency components of the intermediate signal, and combining each successive intermediate signal, the set of synthetic high-frequency components of the successive intermediate signal, and each successive smaller bandwidth enhancement layer, the last successive intermediate signal constituting an output signal, wherein each of the combining includes appropriate delaying of the signals combined in order to provide substantial time alignment of the signals.

7. A video signal encoding and decoding method, comprising
separating the video signal into low-frequency and high-frequency components, said low-frequency components constituting a main or base layer,
processing the low-frequency components of the video signal; to generate synthetic high-frequency components, said processing including bandwidth expansion in the horizontal and/or vertical domain,
generating the difference between the synthetic high-frequency components and the actual high-frequency components, said difference comprising an error signal, said error signal constituting an enhancement layer, the main or base layer and the enhancement layer comprising encoder outputs for transmission or storage,
processing the transmitted or stored main or base layer to generate synthetic high frequency components of the transmitted or stored main or base layer, said processing including bandwidth expansion in the horizontal and/or vertical domain, and
combining the synthetic high-frequency components and the enhancement layer, and the main or base layer to provide a decoded video signal.

8. A method according to claim 7 wherein said low-frequency components are a regenerated version of the low-frequency components of the video signal obtained by a method that includes compressing and decompressing the low-frequency components of the video signal.

9. A method according to claim 8 further comprising compressing said main or base layer and compressing said enhancement layer, the compressed main or base layer and the compressed enhancement layer comprising encoder outputs for transmission or storage, decompressing the transmitted or stored compressed main or base layer, and decompressing the transmitted or stored enhancement layer and wherein said generating the difference includes appropriate delaying of the synthetic and actual high-frequency components in order to provide substantial time alignment of the components, and said combining includes appropriate delaying of the combined signals in order to provide substantial time alignment of the signals.

10. A video signal encoding and decoding method, comprising
separating the video signal into low-frequency and high-frequency components,
processing the low-frequency components of the video signal to generate synthetic high-frequency components,
generating the difference between the synthetic high-frequency components and the actual high-frequency components, said difference comprising an error signal, said error signal constituting a first enhancement layer,
separating said low-frequency components into a further set of low-frequency and high-frequency components, said further set of low-frequency components constituting a main or base layer,
processing the further set of low-frequency components to generate a further set of synthetic high-frequency components,
generating the difference between the further set of synthetic high-frequency components and the further set of actual high-frequency components, said difference comprising a further error signal, said error signal constituting a second enhancement layer, the main or base layer, the first enhancement layer, and the second enhancement layer comprising encoder outputs for transmission or storage,
processing the transmitted or stored main or base layer to generate synthetic high frequency components of the transmitted or stored main or base layer,
combining the synthetic high-frequency components of the transmitted or stored main or base layer, the transmitted or stored second enhancement layer, and the transmitted or stored main or base layer,
processing the combined synthetic high-frequency components of the transmitted or stored main or base layer, the transmitted or stored second enhancement layer, and the transmitted or stored main or base layer to generate a second set of synthetic high frequency components, and
combining the second set of synthetic high-frequency components, the transmitted or stored first enhancement layer, and the combined synthetic high-frequency components of the transmitted or stored main or base layer, the transmitted or stored second enhancement layer, and the transmitted or stored main or base layer to generate a second set of synthetic high frequency components,
wherein said processing the low-frequency components of the video signal, said processing the transmitted or stored main or base layer, and said processing the further set of low-frequency components includes bandwidth expansion in the horizontal and/or vertical domain.

11. A method according to claim 10 wherein said low-frequency components are a regenerated version of the low frequency components of the video signal and said further set of low-frequency components are a regenerated version of the further set of low-frequency components, the method further comprising compressing said main or base layer, compressing said first enhancement layer, and compressing said second enhancement, the compressed main or base layer, the compressed first enhancement layer, and the compressed second enhancement layer comprising encoder outputs for transmission or storage, decompressing the transmitted or stored compressed main or base layer, decompressing the transmitted or stored compressed second enhancement layer, and decompressing the transmitted or stored compressed first enhancement layer.

* * * * *